(12) United States Patent
Park et al.

(10) Patent No.: US 9,420,269 B2
(45) Date of Patent: Aug. 16, 2016

(54) STEREOSCOPIC IMAGE DISPLAY DEVICE AND METHOD FOR DRIVING THE SAME

(71) Applicant: LG Display Co., Ltd., Seoul (KR)

(72) Inventors: Myungsoo Park, Seoul (KR); Bogyun Chung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 336 days.

(21) Appl. No.: 13/941,867

(22) Filed: Jul. 15, 2013

(65) Prior Publication Data

US 2014/0146143 A1 May 29, 2014

(30) Foreign Application Priority Data

Nov. 23, 2012 (KR) .................. 10-2012-0134053

(51) Int. Cl.
*H04N 13/04* (2006.01)

(52) U.S. Cl.
CPC ....... *H04N 13/0415* (2013.01); *H04N 13/0422* (2013.01); *H04N 13/0447* (2013.01)

(58) Field of Classification Search
USPC .......................................................... 348/51
See application file for complete search history.

(56) References Cited

U.S. PATENT DOCUMENTS

| 7,079,174 B2* | 7/2006 | Taniguchi | G06F 3/1423 345/419 |
| 8,976,102 B2* | 3/2015 | Wang | G09G 3/3611 345/103 |
| 2007/0008314 A1* | 1/2007 | Song | H04N 13/0048 345/419 |
| 2007/0296721 A1* | 12/2007 | Chang | G06T 15/10 345/427 |
| 2008/0043094 A1* | 2/2008 | Ijzerman | H04N 13/0454 348/43 |
| 2008/0122813 A1* | 5/2008 | Kim | G09G 3/3648 345/204 |
| 2010/0033634 A1* | 2/2010 | Kim | G09G 3/3611 348/699 |
| 2010/0097449 A1* | 4/2010 | Jeong | G02B 27/2214 348/59 |

FOREIGN PATENT DOCUMENTS

CN 101374244 A 2/2009

OTHER PUBLICATIONS

Chinese First Office Action, Chinese Application No. 201310356688.2, May 11, 2015, 15 pages.

* cited by examiner

*Primary Examiner* — Leron Beck
(74) *Attorney, Agent, or Firm* — Fenwick & West LLP

(57) ABSTRACT

The embodiments herein provide a stereoscopic image display device and method for driving the same capable of improving 2D image quality. The stereoscopic image display device comprises a display panel including a plurality of pixels; a 2D data converter configured to received two-dimensional data for each of a plurality of sub-pixels of the pixels and to convert the 2D data for each of the plurality of sub-pixels into converted 2D data for each of the plurality of sub-pixels based on all of the 2D data for the plurality of sub-pixels; and a display panel driving circuit configured to receive the converted 2D data for each of the plurality of sub-pixels and to supply each of the converted 2D data to a corresponding one of the plurality of sub-pixels in a two-dimensional mode of the stereoscopic image display device.

13 Claims, 12 Drawing Sheets

FIG. 10

| | | | | | | | | | | | | |
|---|---|---|---|---|---|---|---|---|---|---|---|---|
| jth horizontal line | V1, V7,V4 R HID (1, j) | V3, V9,V6 G HID (2, j) | V5, V2,V8 B HID (3, j) | V7, V4,V1 R HID (4, j) | V9, V6,V3 G HID (5, j) | V2, V8,V5 B HID (6, j) | V4, V1,V7 R HID (7, j) | V6, V3,V9 G HID (8, j) | V8, V5,V2 B HID (9, j) | V1, V7,V4 R HID (10, j) | V3, V9,V6 G HID (11, j) | V5, V2,V8 B HID (12, j) | ... |

| | | | | | | | | | | | | |
|---|---|---|---|---|---|---|---|---|---|---|---|---|
| (j+1)th horizontal line | V3, V9,V6 R HID (1, j+1) | V5, V2,V8 G HID (2, j+1) | V7, V4,V1 B HID (3, j+1) | V9, V6,V3 R HID (4, j+1) | V2, V8,V5 G HID (5, j+1) | V4, V1,V7 B HID (6, j+1) | V6, V3,V9 R HID (7, j+1) | V8, V5,V2 G HID (8, j+1) | V1, V7,V4 B HID (9, j+1) | V3, V9,V6 R HID (10, j+1) | V5, V2,V8 G HID (11, j+1) | V4, V1,V7 B HID (12, j+1) | ... |

| | | | | | | | | | | | | |
|---|---|---|---|---|---|---|---|---|---|---|---|---|
| (j+2)th horizontal line | V5, V2,V8 R HID (1, j+2) | V7, V4,V1 G HID (2, j+2) | V9, V6,V3 B HID (3, j+2) | V2, V8,V5 R HID (4, j+2) | V4, V1,V7 G HID (5, j+2) | V6, V3,V9 B HID (6, j+2) | V8, V5,V2 R HID (7, j+2) | V1, V7,V4 G HID (8, j+2) | V3, V9,V6 B HID (9, j+2) | V5, V2,V8 R HID (10, j+2) | V4, V1,V7 G HID (11, j+2) | V6, V3,V9 B HID (12, j+2) | ... |

| | | | | | | | | | | | | |
|---|---|---|---|---|---|---|---|---|---|---|---|---|
| jth horizontal line | V1~V9 R VID (1, j) | V1~V9 G VID (2, j) | V1~V9 B VID (3, j) | V1~V9 R VID (4, j) | V1~V9 G VID (5, j) | V1~V9 B VID (6, j) | V1~V9 R VID (7, j) | V1~V9 G VID (8, j) | V1~V9 B VID (9, j) | V1~V9 R VID (10, j) | V1~V9 G VID (11, j) | V1~V9 B VID (12, j) | ... |

STEREOSCOPIC IMAGE DISPLAY DEVICE AND METHOD FOR DRIVING THE SAME

CROSS-REFERENCE TO RELATED APPLICATION

This application claims priority under 35 U.S.C. §119(a) of Korean Patent Application No. 10-2012-0134053, filed on Nov. 23, 2012, which is incorporated by reference in its entirety.

BACKGROUND

1. Technical Field

This document relates to a stereoscopic image display device and method for driving the same which improves two-dimensional (2D) image quality.

2. Discussion of the Related Art

Techniques for implementing a stereoscopic image display device to display three-dimensional (3D) images are classified as either a stereoscopic technique or an autostereoscopic technique. The stereoscopic technique uses a binocular parallax image between the left and right eyes of a viewer and includes a glasses type technique and a non-glasses type technique. The glasses type technique is classified into a patterned retarder type and shutter glasses type. The non-glasses type technique is classified into a barrier type and lens type. In the non-glasses type technique, 3D images are implemented by using an optical plate such as a barrier plate and a lens plate for separating the binocular parallax image. The non-glasses type has an advantage of convenience due to watching the 3D images without wearing shutter glasses or polarization glasses which are necessary for the glasses type technique. Thus, nowadays the non-glasses type technique has been applied in small and medium sized displays such as smart phones, tablets, and notebooks.

The stereoscopic image display device of the non-glasses type technique includes an optical plate such as the barrier plate and the lens plate which is positioned between a display panel and a user. In the non-glasses type technique, the optical plate controls optical paths of the binocular parallax image displayed in the display panel for implementing the 3D images. Meanwhile, multi-view images may be used as the binocular parallax image. In this case, the non-glasses type technique may display n (n is an integer greater than 2) view images from the display panel to n viewpoints by controlling optical paths of n view images with the optical plate. The user may watch one of n view images through the user's left eye and another through the user's right eye because viewpoints on which the user's left eye and right eye are positioned are different from each other. Therefore, the user may watch the 3D images by binocular parallax.

Also, in the non-glasses type technique, the optical plate controls optical paths of 2D images displayed in the display panel. In this case, the non-glasses type technique may display the 2D images from the display panel to n viewpoints by controlling optical paths of the 2D images with the optical plate. The user may watch a part of the 2D images through the user's left eye and another part of the 2D images through the user's right eye because viewpoints on which the user's left eye and right eye are positioned are different from each other. Therefore, the user may only watch a part of the 2D images resulting in the user feeling that 2D image quality is degraded.

SUMMARY

The embodiments herein have been made in an effort to provide a stereoscopic image display device and method for driving the same capable of improving 2D image quality in spite of being implemented as the non-glasses type technique.

In one embodiment, a stereoscopic image display device comprises: a display panel including a plurality of pixels; an optical plate configured to control display of images in a plurality of sub-pixels of the pixels in a plurality of viewpoints; a 2D data converter configured to receive two-dimensional (2D) data for each of the plurality of sub-pixels and to convert the 2D data for each of the plurality of sub-pixels into converted 2D data for each of the plurality of sub-pixels based on all of the 2D data for the plurality of sub-pixels; and a display panel driving circuit configured to receive the converted 2D data for each of the plurality of sub-pixels and to supply each of the converted 2D data to a corresponding one of the plurality of sub-pixels in a two-dimensional (2D) mode of the stereoscopic image display device.

In one embodiment, a method for driving a stereoscopic image display device including a plurality of pixels, and an optical plate configured to control display of images in a plurality of sub-pixels of the pixels in a plurality of viewpoints, the method comprising: receiving two-dimensional (2D) data for each of the plurality of sub-pixels; converting the 2D data for each of the plurality of sub-pixels into converted 2D data for each of the plurality of sub-pixels based on all the 2D data for the plurality of sub-pixels; and supplying each of the converted 2D data to a corresponding one of the plurality of sub-pixels in a 2D mode of the stereoscopic image display device.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIG. 10 is an exemplary diagram showing vertical interpolation data of the jth horizontal line calculated from horizontal interpolation data of jth to (j+VIN)th horizontal lines according to one embodiment;

DETAILED DESCRIPTION

Figure 1:
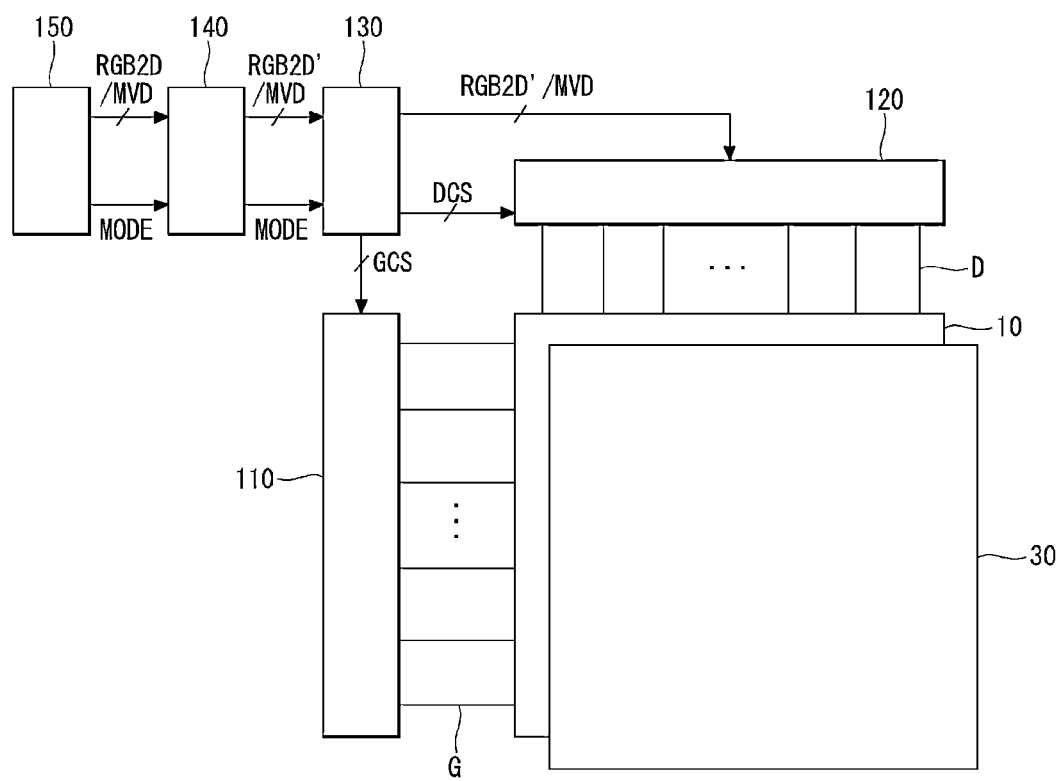
FIG. 1 is a block diagram schematic of a stereoscopic image display device according to one embodiment.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

FIG. 1 is a block diagram schematic of a stereoscopic image display device according to one embodiment. With reference to FIG. 1, the stereoscopic image display device according to one embodiment comprises a display panel 10, an optical plate 30, a gate driver 110, a data driver 120, a timing controller 130, a 2D data converter 140, a host system 150, and the like. The stereoscopic image display device according to the embodiment may be implemented as a flat panel display such as a liquid crystal display (LCD), a field emission display (FED), a plasma display panel (PDP) display, and an organic light emitting diode (OLED) display. In the following description, the liquid crystal display (LCD) is described as an example of the stereoscopic image display device. However, embodiments of the invention are not limited thereto. For example, other kinds of flat panel display, such as FED, PDP, and OLED, may be used.

The display panel 10 includes a thin film transistor (TFT) substrate and a color filter substrate (not shown). A liquid crystal layer (not shown) is formed between the TFT substrate and the color filter substrate. Data lines D and gate lines (or scan lines) G crossing over the data lines D are formed on the TFT substrate. Pixels are arranged in a matrix form in cell areas defined by the data lines D and the gate lines G. A TFT formed at each of the crossings of the data lines D and the gate lines G transfers a data voltage supplied via the data line D to a pixel electrode of the liquid crystal cell in response to a gate pulse supplied through the gate line G. A common voltage is supplied to a common electrode. Each of the pixels controls transmittance of light by driving liquid crystals of the liquid crystal layer by an electric field between the pixel electrode and the common electrode. Therefore, pixels of the display panel 10 may display an image.

A color filter array (not shown), including a black matrix and a color filter, is formed on the color filter substrate. The common electrode is formed on the color filter substrate in a vertical electric field driving manner, such as a twisted nematic (TN) mode and a vertical alignment (VA) mode. The common electrode is formed on the TFT substrate along with the pixel electrode in a horizontal electric field driving manner, such as an in-plane switching (IPS) mode and a fringe field switching (FFS) mode. The display panel 10 may be implemented in any liquid crystal mode such as the TN, VA, IPS, and FFS modes.

An upper polarizing plate (not shown) is attached to the color filter substrate and a lower polarizing plate (not shown) is attached to the TFT substrate. Alignment layers (not shown) for setting pre-tilt angles of liquid crystals are respectively formed on the TFT substrate and the color filter substrate. A spacer (not shown) is formed between the TFT substrate and the color filter substrate to maintain a cell gap of the liquid crystal layer.

The display panel 10 may be implemented as a transmissive type liquid crystal panel modulating light from a backlight unit (not shown). The backlight unit includes a plurality of light sources, a light guide plate (or a diffusion plate), a plurality of optical sheets, and the like. The backlight unit may be implemented as an edge type backlight unit or a direct type backlight unit. The light sources of the backlight unit may include at least one of a hot cathode fluorescent lamp (HCFL), a cold cathode fluorescent lamp (CCFL), an external electrode fluorescent lamp (EEFL), and a light emitting diode (LED).

Figure 2:
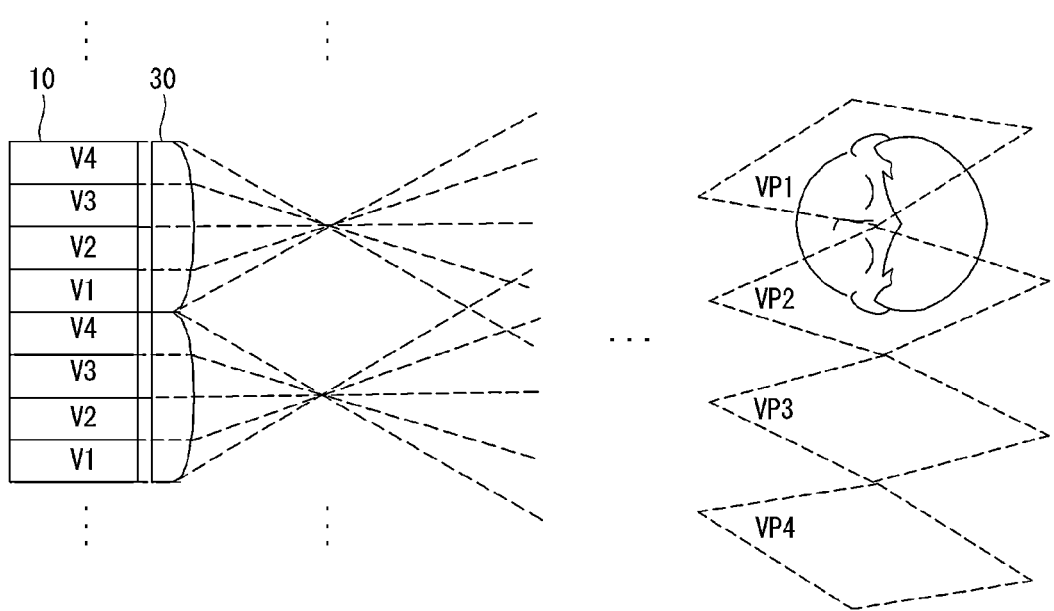
FIG. 2 is an exemplary diagram showing 3D image implementation according to non-glasses type technique according to one embodiment.

With reference to FIG. 2, the optical plate 30 is disposed on the display panel 10. As shown in FIG. 2, the optical plate 30 controls optical paths of view images V1~V4 so that each of four view images V1~V4 displayed in sub-pixels reaches each of four viewpoints VP1~VP4 in a 3D mode. For example, the optical plate 30 controls the display panel 10 such that a first view image V1 displayed in sub-pixels reaches a first viewpoint VP1. As shown in FIG. 2, when the user's left-eye is positioned on a second viewpoint VP2 and the user's right-eye is positioned on a first viewpoint VP1, the user may watch a first view image V1 through the user's right-eye and a second view image V2 through the user's left-eye. Therefore, the user may feel a three-dimensional effect by a binocular parallax. Meanwhile, multi-view images include the first to nth view images, wherein n is an integer greater than 2. The first to nth view images may be produced by separating cameras collecting an image such as an object. Especially, cameras may be separated by the general distance between the left and right eyes of a user.

Figure 3:
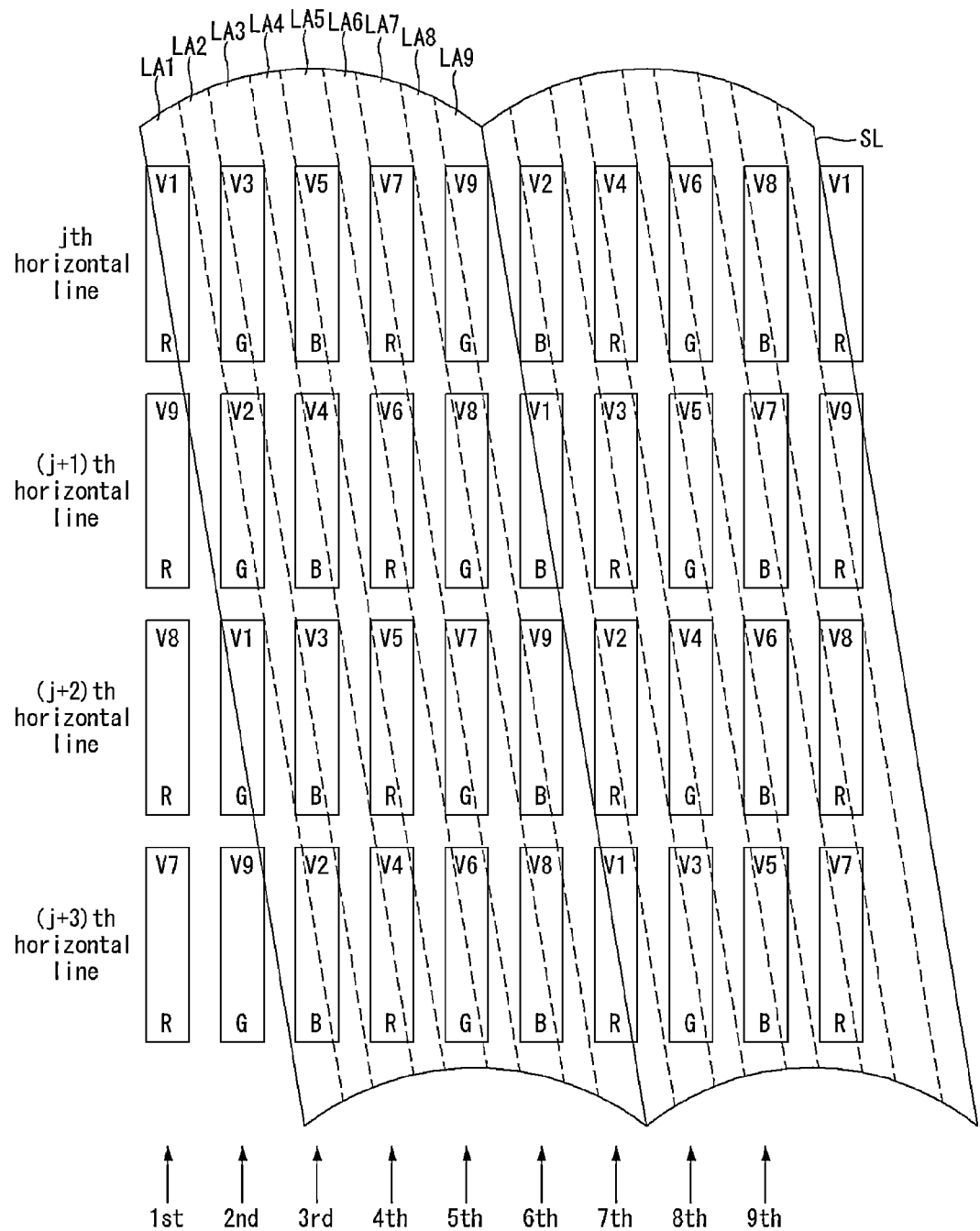
FIG. 3 is an exemplary diagram showing an arrangement of pixels of a display panel and an optical plate according to one embodiment.

The optical plate 30 is implemented as a parallax barrier or a lenticular lens. In the following description, the lenticular lens is described as an example of the optical plate 30. However, embodiments of the invention are not limited thereto. Also, the optical plate 30 is implemented as a vertical arrangement method or a slanted arrangement method. The vertical arrangement method means that the optical plate 30 is disposed on the display panel 10 in a direction parallel to longest side of a pixel. The slanted arrangement method means that the optical plate 30 is disposed on the display panel 10 in a direction oblique against a pixel as shown in FIG. 3. In the following description, the slanted arrangement method is described as an example. However, embodiments of the invention are not limited thereto. An arrangement of pixels of a display panel and an optical plate will be described with reference to FIG. 3.

Referring back to FIG. 1, the data driver 120 includes a plurality of source driver integrated circuits (ICs) (not shown). The source driver ICs receive 2D conversion data RGB2D' or multi-view image data MVD from the timing controller 130. The source driver ICs convert the 2D conversion data RGB2D' or the multi-view image data MVD into positive or negative polarity analog data voltages under control of the timing controller 130. The source driver ICs supply the positive and negative analog data voltages to the data lines D of the display panel 10.

The gate driver 110 sequentially supplies gate pulses synchronized with the data voltage to the gate lines G of the display panel 10 under control of the timing controller 130. The gate driver 110 includes a plurality of gate driver ICs (not shown). Each of the gate driver ICs may include a shift register, a level shifter for converting an output signal of the shift register into a signal having a swing width suitable for a TFT drive of the display panel 10, an output buffer, and the like.

The timing controller 130 receives the 2D conversion data RGB2D' or the multi-view image data MVD, timing signals, and a mode signal MODE from the 2D data converter 140. The timing signals may include a vertical synchronization signal, a horizontal synchronization signal, a data enable signal, a dot clock, etc.

The timing controller 130 generates a gate control signal GCS for controlling the gate driver 110 and a data control signal DCS for controlling the data driver 120, based on the 2D conversion data RGB2D' or the multi-view image data MVD, timing signals, and the mode signal MODE. The timing controller 130 outputs the gate control signal GCS to the gate driver 110. The timing controller 130 outputs the 2D conversion data RGB2D' and the data control signal DCS to the data driver 120 in the 2D mode. Also, the timing controller 130 outputs the multi-view image data MVD and the data control signal DCS to the data driver 120 in the 3D mode.

The gate driver 110, the data driver 120, and the timing controller 130 function as a display panel driver for driving the display panel 10. Especially, the display panel driver controls that n view image data are supplied to n sub-pixels in the 3D mode and n 2D conversion data are supplied to the n sub-pixels in the 2D mode. The multi-view image data MVD includes n view image data and the 2D conversion data RGB2D' includes n 2D conversion data.

The 2D data converter 140 distinguishes the 2D mode from the 3D mode according to the mode signal MODE. The 2D data converter 140 does not convert the multi-view image data MVD and outputs the multi-view image data MVD as it is to the timing controller 130 in the 3D mode. The 2D data converter 140 converts 2D image data RGB2D into 2D conversion data RGB2D' in the 2D mode. More specifically, the 2D data converter 140 converts n 2D data supplied to n sub-pixels so that each of the n 2D data includes all of the n 2D data. That is, the 2D data converter 140 converts the 2D data for each sub-pixel into converted 2D data (RGB2D') based on the pre-conversion 2D data (RGB2D) for all of the sub-pixels. The 2D data converter 140 does not convert the multi-view image data MVD and outputs the multi-view image data MVD as it is to the timing controller 130 in the 3D mode. Therefore, the embodiments of the invention prevent the user from watching a part of 2D images displayed in n sub-pixels through each of the user's left-eye and right-eye even though each of the user's left-eye and right-eye are positioned on any one viewpoint. Accordingly, the embodiments of the invention may improve 2D image quality in spite of non-glasses type implementing 3D images by the optical plate.

The host system 150 supplies the 2D image data RGB2D or the multi-view data MVD to the 2D data converter 140 through an interface such as a low voltage differential signaling (LVDS) interface or a transition minimized differential signaling (TMDS) interface. The host system 150 may include a 3D formatter for arranging the multi-view image data MVD according to pixel arrangement of the display panel 10. Furthermore, the host system 150 may supply the timing signals and the mode signal MODE, for distinguishing the 2D mode from the 3D mode, to the 2D data converter 140.

FIG. 3 is an exemplary diagram showing an arrangement of pixels of a display panel 10 and an optical plate 30. In FIG. 3, it is described as an example of the stereoscopic image display device that sub-pixels of the display panel 10 displays nine view images V1~V9. That is, sub-pixels of the display panel 10 may display n view images. However, embodiments of the invention are not limited thereto. Also, in FIG. 3, a lenticular lens is described as an example of the optical plate 30. However, embodiments of the invention are not limited thereto. That is, the optical plate 30 may be implemented as a parallax barrier. Also, in FIG. 3, the slanted arrangement method is described as an example. However, embodiments of the invention are not limited thereto. Furthermore, in FIG. 3, each pixel of the display panel 10 includes red, green, and blue sub-pixels. However, embodiments of the invention are not limited thereto.

With reference to FIG. 3, a slanted lens SL is defined as a lenticular lens implemented as the slanted arrangement method. The slanted lens SL separates images displayed in n sub-pixels into n viewpoints. The slanted lens SL includes first to ninth lens areas LA1~LA9. Images displayed in sub-pixels included in the uth lens area LAu reaches the uth viewpoint by the slanted lens, wherein u is an integer equal to or greater than 1 and equal to or less than n.

In the 3D mode, nine sub-pixels displays first to ninth view images V1~V9. More specifically, the uth view image Vu displayed in sub-pixels included in the uth lens area LAu reaches the uth viewpoint by the slanted lens SL in the 3D mode. For example, when the user's left-eye is positioned on the second viewpoint and the user's right-eye is positioned on the first viewpoint, the user may watch the first view image V1 through the user's right-eye and the second view image V2 through the user's left-eye in the 3D mode. Therefore, the user may feel a three-dimensional effect by a binocular parallax. Meanwhile, the first to nth view images may be produced by separating cameras collecting an image such as an object. Especially, cameras may be separated by the general distance between the left and right eyes of a user.

In the 2D mode, nine sub-pixels displays 2D images. More specifically, 2D image displayed in sub-pixels included in the uth lens area LAu reaches the uth viewpoint by the slanted lens SL in the 2D mode. For example, when the user's left-eye is positioned on the second viewpoint and the user's right-eye is positioned on the first viewpoint, the user may watch 2D images displayed in sub-pixels included in the first lens area LA1 through the user's left-eye and 2D images displayed in sub-pixels included in the second lens area LA2 through the user's right-eye in the 2D mode. That is, 2D images are separated into the first to ninth viewpoints by the slanted lens SL even though the 2D images do not need to be separated. Therefore, the user may watch a part of the 2D images through the user's left eye and another part of the 2D images through the user's right eye. The user may feel that 2D image quality is fallen.

However, the embodiments of the invention convert the n 2D data for n sub-pixels based on the 2D data of all of the other sub-pixels. Thus, the embodiments of the invention prevent the user from watching 2D images displayed in n sub-pixels through each of the user's left-eye and right-eye even though each of the user's left-eye and right-eye are positioned on any one viewpoint. In the below, 2D data conversion method improving 2D image quality is described with reference to FIGS. 4 and 5.

Figure 4:
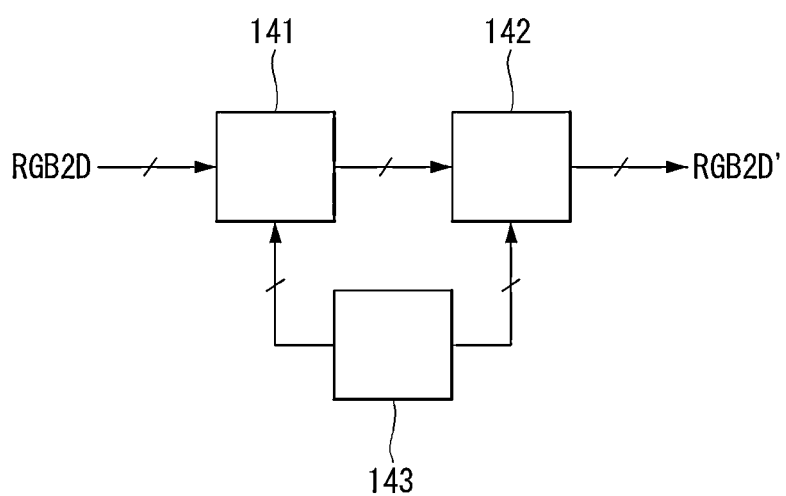
FIG. 4 is a block diagram showing an image processor of FIG. 1 according to one embodiment.
Figure 5:
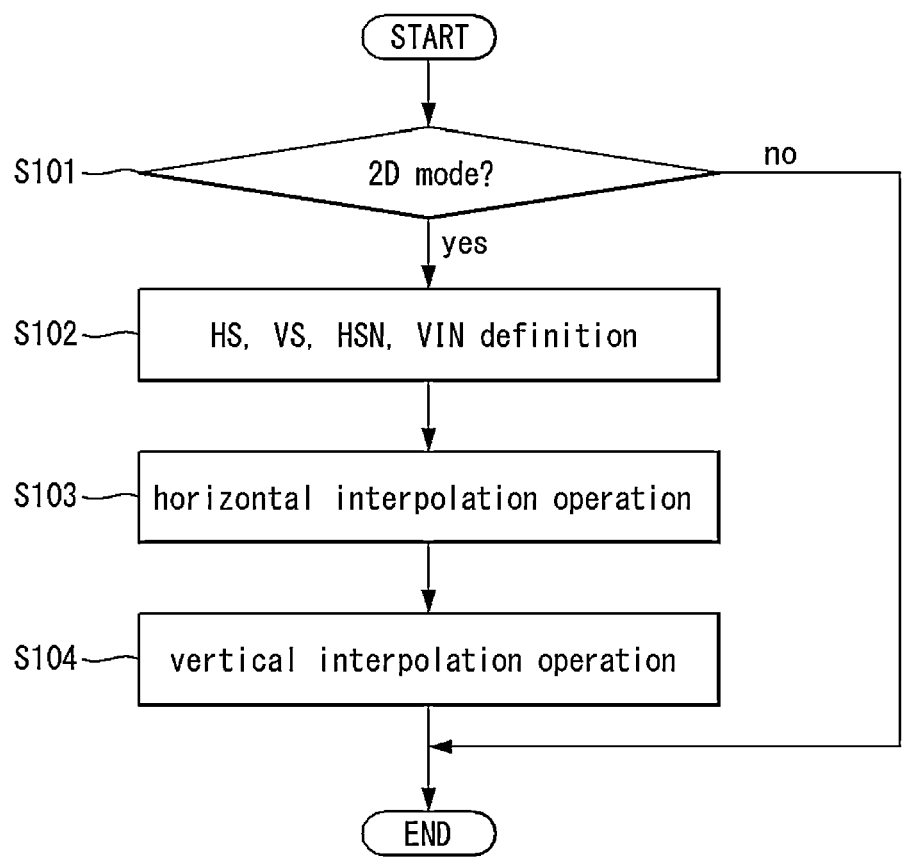
FIG. 5 is a flow chart showing an image processing method of an image processor according to one embodiment.

FIG. 4 is a block diagram showing a 2D data converter 140 of FIG. 1. FIG. 5 is a flow chart showing a 2D data conversion method of the 2D data converter 140. With reference to FIG. 4, the 2D data converter 140 includes a horizontal interpolation unit 141, a vertical interpolation unit 142, and a memory 143. Meanwhile, the 2D data conversion method of the 2D data converter 140 is described based on an arrangement of pixels of a display panel 10 and an optical plate 30 shown in FIG. 3.

First, the 2D data converter 140 distinguishes the 2D mode from the 3D mode according to the mode signal MODE. The 2D data converter 140 does not convert the multi-view image data MVD and outputs the multi-view image data MVD as it is to the timing controller 130 in the 3D mode. The 2D data converter 140 converts 2D image data RGB2D into 2D conversion data RGB2D' in the 2D mode. More specifically, the 2D data converter 140 converts the n 2D data supplied to n sub-pixels such that each of the n 2D data includes all of the n 2D data. That is, the 2D data converter 140 converts the 2D data for each sub-pixel into converted 2D data based on the pre-conversion 2D data for all of the sub-pixels. To convert the 2D data for the n sub-pixels, the horizontal interpolation unit 141 performs a horizontal interpolation operation and the vertical interpolation unit 142 performs a vertical interpolation operation. (See S101 in FIG. 4)

Second, a horizontal repetition value HS, a vertical repetition value VS, and a horizontal interpolation value HSN, and a vertical interpolation value VIN should be defined such that the horizontal interpolation unit 141 performs a horizontal interpolation operation and the vertical interpolation unit 142 performs a vertical interpolation operation. The horizontal repetition value HS, the vertical repetition value VS, the horizontal interpolation value HSN, and the vertical interpolation value VIN are predetermined because they depend on the number of view images, the number of sub-pixels included in a pixel, and so on.

The horizontal repetition value HS is defined as the number of pixels from a kth sub-pixel to a (k+p)th sub-pixel on a jth horizontal line, wherein the (k+p)th sub-pixel on the jth horizontal line is the most adjacent to the kth sub-pixel in a horizontal direction, has a same color as the kth sub-pixel, and displays a same view image as the kth sub-pixel. That is, the horizontal repetition value HS may be the position p of the (k+p)th sub-pixel on the jth horizontal line.

Figure 6:
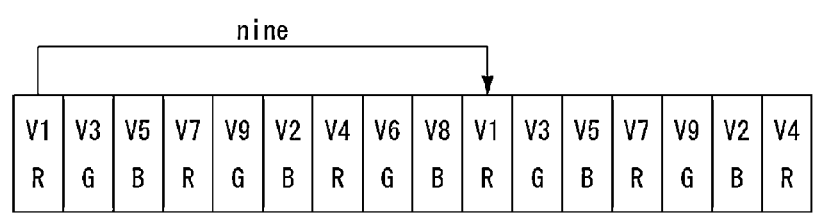
FIG. 6 is an exemplary diagram showing sub-pixels arranged on a horizontal line and view images displayed in the sub-pixels according to one embodiment.

FIG. 6 is an exemplary diagram showing sub-pixels arranged on a horizontal line and view images displayed in the sub-pixels. As shown in FIGS. 3 and 6, when the display panel 10 displays the multi-view images including the first to ninth view images, the number of pixels from one red sub-pixel R displaying the first view image V1 to another red sub-pixel R displaying the first view image V1 are nine, wherein the another red sub-pixel R should be the most adjacent to the one red sub-pixel R in the horizontal direction. In this case, the horizontal repetition value HS is nine.

The vertical repetition value VS is defined as the number of pixels from the kth sub-pixel to a (k+q)th sub-pixel on the jth horizontal line, wherein the (k+q)th sub-pixel on the jth horizontal line is the most adjacent to the kth sub-pixel in a vertical direction, has a same color as the kth sub-pixel, and displays a same view image as the kth sub-pixel. That is, the vertical repetition value VS may be the position q of the (k+q)th sub-pixel on the jth horizontal line.

Figure 7:
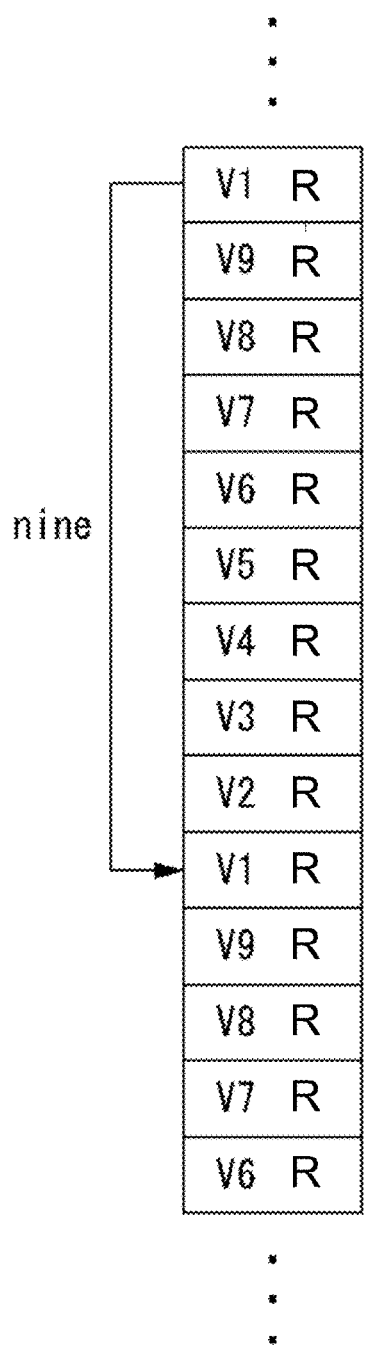
FIG. 7 is an exemplary diagram showing sub-pixels arranged on a vertical line and view images displayed in the sub-pixels according to one embodiment.

FIG. 7 is an exemplary diagram showing sub-pixels arranged on a vertical line and view images displayed in the sub-pixels. As shown in FIGS. 3 and 7, when the display panel 10 displays the multi-view images including the first to ninth view images, the number of pixels from one red sub-pixel R displaying the first view image V1 to another red sub-pixel R displaying the first view image V1 are nine, wherein the another red sub-pixel R should be the most adjacent to the one red sub-pixel R in the vertical direction. In this case, the vertical repetition value VS is nine.

The horizontal interpolation value HSN is defined as a value which divides the horizontal repetition value HS into the number N of sub-pixels included in a pixel. Hence, the horizontal interpolation value HSN can be expressed in the following equation:

$$HSN = \frac{HS}{N} \quad (1)$$

The vertical interpolation value VIN is defined as a value which divides the number n of the view image data into the horizontal interpolation value HSN. Hence, the vertical interpolation value VIN can be expressed in the following equation:

$$VIN = \frac{n}{HSN} \quad (2)$$

Meanwhile, the memory 143 stores the horizontal repetition value HS, the vertical repetition value VS, the horizontal interpolation value HSN, and the vertical interpolation value. The horizontal interpolation unit 141 receives the horizontal repetition value HS and the horizontal interpolation value HSN from the memory 143 when performing the horizontal interpolation operation. The vertical interpolation unit 142 receives the vertical repetition value VS and the vertical interpolation value VIN from the memory 143 when performing the vertical interpolation operation. (See S102 in FIG. 5)

Third, the horizontal interpolation unit 141 receives 2D image data RGB2D and performs the horizontal interpolation operation. The 2D image data RGB2D may include r*s 2D data, wherein r is the number of sub-pixels on a horizontal line and s is the number of sub-pixels on a vertical line. The horizontal interpolation unit 141 may interpolate 2D data supplied to sub-pixels on the jth horizontal line in the horizontal direction.

The horizontal interpolation unit 141 may calculate kth horizontal interpolation data HID(k,j) of the jth horizontal line according to first embodiment of the invention. The kth 2D data of the jth horizontal line can be expressed as 2D data (SP(k,j)) at a coordinate (k,j). The kth horizontal interpolation data HID(k,j) of the jth horizontal line can be expressed as horizontal interpolation data HID(k,j) at a coordinate (k,j). In one embodiment, the kth horizontal interpolation data HID (k,j) of the jth horizontal line can be expressed in the following equation:

$$HID(k, j) = \frac{\sum_{u=1}^{HSN} SP(k + N \times (u-1), j)}{HSN} \quad (3)$$

In equation 3, HID(k,j) refers to the kth horizontal interpolation data on the jth horizontal line, HSN refers to the horizontal interpolation value, SP(k+N*(u−1), j) refers to (k+N*(u−1), j)th 2D data on the jth horizontal line. For example, when HSN is three, the horizontal interpolation unit 141 may calculate the kth horizontal interpolation data HID (j,k) on the jth horizontal line by using kth 2D data SP(k, j), (k+N)th 2D data SP(k+N, j), and (k+2N)th 2D data SP(k+2N, j) of the jth horizontal line. The kth 2D data SP(k, j), the (k+N)th 2D data SP(k+N, j), and the (k+2N)th 2D data SP(k+2N, j) of the jth horizontal line may be same color data and separate view image data.

Figure 8:
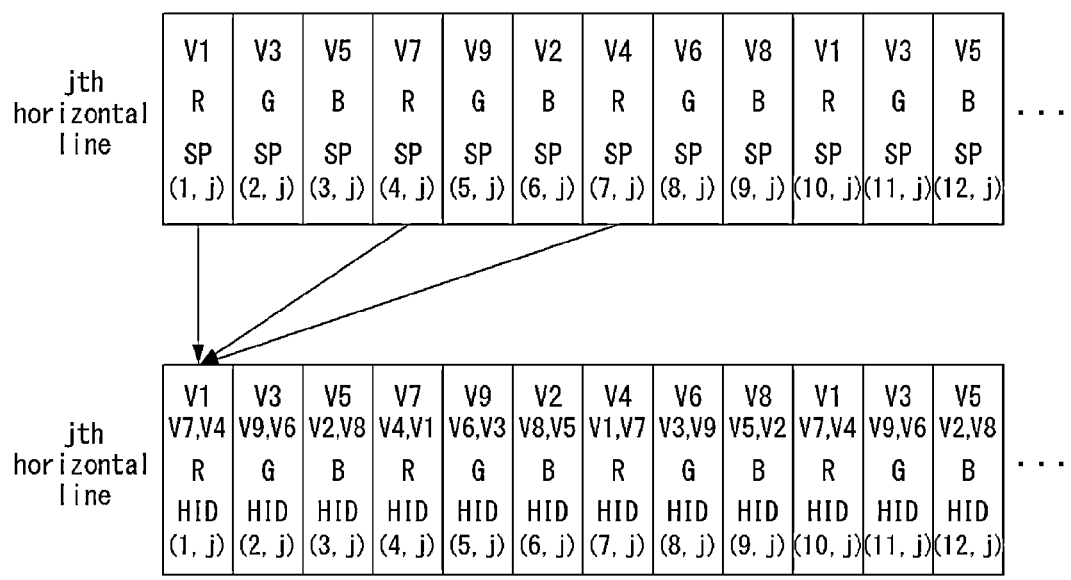
FIG. 8 is an exemplary diagram showing horizontal interpolation data of a jth horizontal line calculated from sub-pixel data of the jth horizontal line according to one embodiment.

FIG. 8 is an exemplary diagram showing horizontal interpolation data of a jth horizontal line calculated from sub-pixel data of the jth horizontal line. As shown in FIG. 8, first horizontal interpolation data HID(1,j) of the jth horizontal line may be calculated as the average of first 2D data SP(1,j), fourth 2D data SP(4,j), and seventh 2D data SP(7,j) of the jth horizontal line when HSN is three. The first 2D data SP(1,j), fourth 2D data SP(4,j), and seventh 2D data SP(7,j) of the jth horizontal line are red color data. Also, as shown in FIG. 3, the first 2D data SP(1,j) of the jth horizontal line is supplied to a sub-pixel arranged in the first lens area LA1, the fourth 2D data SP(4,j) of the jth horizontal line is supplied to a sub-pixel arranged in the seventh lens area LA7, and seventh 2D data SP(7,j) of the jth horizontal line is supplied to a sub-pixel arranged in the fourth lens area LA4.

Meanwhile, the horizontal interpolation unit 141 cannot calculate each of (r−6)th to rth 2D data SP(r−6,j)~SP(r,j) of the jth horizontal line as expressed in the equation 3 because the (k+2N) 2D data SP(k+2N) does not exist for each of (r−6)th to rth 2D data SP(r−6,j)~SP(r,j). Therefore, the horizontal interpolation unit 141 may assign each of (r−6)th to rth 2D data SP(r−6,j)~SP(r,j) into each of (r−6)th to rth horizontal interpolation data HID(r−6,j)~HID(r,j) as shown in FIG. 8.

Alternatively, the horizontal interpolation unit 141 may calculate kth horizontal interpolation data HID(k,j) of the jth horizontal line according to a second embodiment of the invention. The kth horizontal interpolation data HID(k,j) of the jth horizontal line can be expressed in the following equation:

$$HID(k, j) = \frac{\sum_{u=1}^{HSN} SP(k - N \times (u - 1), j)}{HSN} \quad (4)$$

In equation 4, HID(k,j) refers to the kth horizontal interpolation data on the jth horizontal line, HSN refers to the horizontal interpolation value, SP(k−N*(u−1), j) refers to (k−N*(u−1), j)th 2D data on the jth horizontal line. For example, when HSN is three, the horizontal interpolation unit 141 may calculate the kth horizontal interpolation data HID(j,k) on the jth horizontal line by using kth 2D data SP(k, j), (k−N)th 2D data SP(k−N, j), and (k−2N)th 2D data SP(k−2N, j) of the jth horizontal line. The kth 2D data SP(k, j), the (k−N)th 2D data SP(k−N, j), and the (k−2N)th 2D data SP(k−2N, j) of the jth horizontal line may be same color data and separate view image data.

Figure 9:
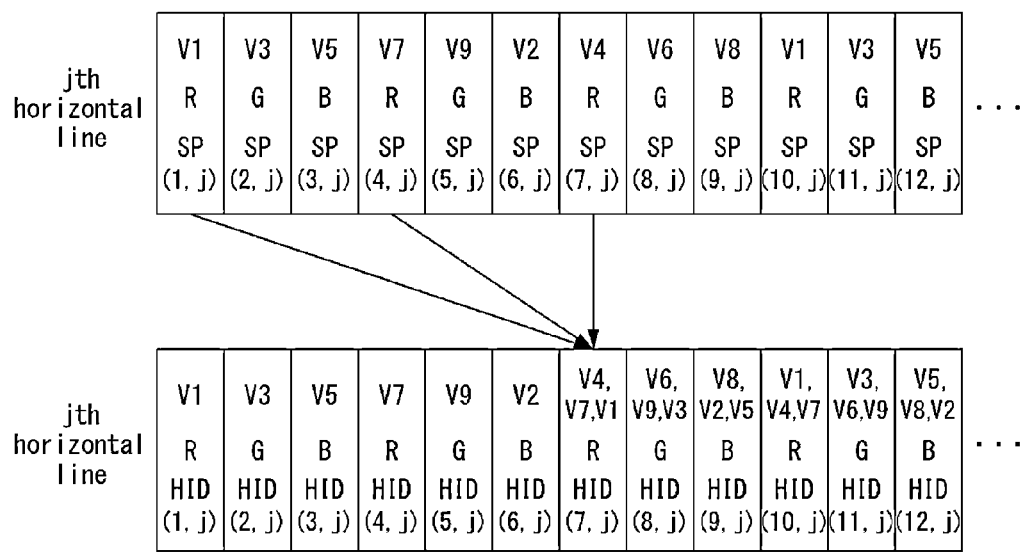
FIG. 9 is another exemplary diagram showing horizontal interpolation data of a jth horizontal line calculated from sub-pixel data of the jth horizontal line according to one embodiment.

FIG. 9 is another exemplary diagram showing horizontal interpolation data of a jth horizontal line calculated from sub-pixel data of the jth horizontal line. As shown in FIG. 9, seventh horizontal interpolation data HID(7,j) of the jth horizontal line may be calculated as the average of seventh 2D data SP(7,j), fourth 2D data SP(4,j), and first 2D data SP(1,j) of the jth horizontal line when HSN is three. The first 2D data SP(1,j), fourth 2D data SP(4,j), and seventh 2D data SP(7,j) of the jth horizontal line are red color data. Also, as shown in FIG. 3, the first 2D data SP(1,j) of the jth horizontal line is supplied to a sub-pixel arranged in the first lens area LA1, the fourth 2D data SP(4,j) of the jth horizontal line is supplied to a sub-pixel arranged in the seventh lens area LA7, and seventh 2D data SP(7,j) of the jth horizontal line is supplied to a sub-pixel arranged in the fourth lens area LA4.

Meanwhile, the horizontal interpolation unit 141 cannot calculate each of first to sixth 2D data SP(1,j)~SP(6,j) of the jth horizontal line as expressed in the equation 4 because the (k−2N) 2D data SP(k−2N) does not exist for each of first to sixth 2D data SP(1,j)~SP(6,j). Therefore, the horizontal interpolation unit 141 may assign each of first to sixth 2D data SP(1,j)~SP(6,j) into each of first to sixth horizontal interpolation data HID(1,j)~HID(6,j) as shown in FIG. 9.

As described above, the horizontal interpolation unit 141 may calculate the kth horizontal interpolation data HID(k,j) of the jth horizontal line by using a plurality of 2D data of the jth horizontal line with equation 3 or 4. (See S103 in FIG. 5)

Fourth, the vertical interpolation unit 142 may calculate the kth vertical interpolation data VID(k,j) of the jth horizontal line by using horizontal interpolation data of the jth horizontal line and adjacent lines to the jth horizontal line. More specifically, the vertical interpolation unit 142 may calculate kth vertical interpolation data VID(k,j) of the jth horizontal line by using horizontal interpolation data HID(k,j) of jth to (j+VIN) horizontal lines calculated from the horizontal interpolation unit 141. The kth horizontal interpolation data HID (k,j) of the jth horizontal line can be expressed as horizontal interpolation data HID(k,j) at a coordinate (k,j). The kth vertical interpolation data VID(k,j) of the jth horizontal line can be expressed as vertical interpolation data VID(k,j) at a coordinate (k,j). The kth vertical interpolation data VID(k,j) of the jth horizontal line can be expressed in the following equation:

$$VID(k, j) = \frac{\sum_{v=0}^{VIN-1} HID(k, j + v)}{VIN} \quad (5)$$

In equation 5, VID(k,j) refers to the kth vertical interpolation data on the jth horizontal line, VIN refers to the vertical interpolation value, and HID(k,j+v) refers to the kth horizontal interpolation data on (j+v)th horizontal line. For example, when VIN is three, the vertical interpolation unit 142 may calculate the kth vertical interpolation data VID(j,k) on the jth horizontal line by using kth horizontal interpolation data HID (k, j), HID(k, j+1), HID(k, j+2) of the (jth to (j+2)th horizontal line. The kth horizontal interpolation data HID(k, j), HID(k, j+1), HID(k, j+2) of the (j) th to (j+2)th horizontal line may be horizontal interpolation data interpolated by the same color data.

FIG. 10 is an exemplary diagram showing vertical interpolation data of the jth horizontal line calculated from horizontal interpolation data of jth to (j+VIN)th horizontal lines. As shown in FIG. 10, first vertical interpolation data VID(1,j) of the jth horizontal line may be calculated as the average of first horizontal data HID(1,j), HID(1,j+1), HID(1,j+2) of the jth to (j+2)th horizontal lines when VIN is three.

In FIG. 10, the first horizontal interpolation data HID(1,j) of the jth horizontal line is an average of the first 2D data SP(1,j), the fourth 2D data SP(4,j), and the seventh 2D data SP(7,j) of the jth horizontal line. With reference to FIGS. 3 and 10, the first 2D data SP(1,j) of the jth horizontal line is supplied to a sub-pixel arranged in the first lens area LA1, the fourth 2D data SP(4,j) of the jth horizontal line is supplied to a sub-pixel arranged in the seventh lens area LA7, and seventh 2D data SP(7,j) of the jth horizontal line is supplied to a sub-pixel arranged in the fourth lens area LA4. The image displayed in the sub-pixel arranged in the first lens area LA1 reaches the first viewpoint, the image displayed in the sub-pixel arranged in the fourth lens area LA4 reaches the fourth viewpoint, and the image displayed in the sub-pixel arranged in the seventh lens area LA7 reaches the seventh viewpoint.

In FIG. 10, the first horizontal interpolation data HID(1,j+1) of the (j+1)th horizontal line is an average of the third 2D data SP(3,j+1), the ninth 2D data SP(9,j+1), and the sixth 2D data SP(6,j+1) of the (j+1)th horizontal line. With reference to FIGS. 3 and 10, the third 2D data SP(1,j+1) of the (j+1)th horizontal line is supplied to a sub-pixel arranged in the fourth lens area LA4, the ninth 2D data SP(9,j+1) of the (j+1)th horizontal line is supplied to a sub-pixel arranged in the eighth lens area LA8, and sixth 2D data SP(6,j+1) of the (j+1)th horizontal line is supplied to a sub-pixel arranged in the second lens area LA2. The image displayed in the sub-pixel arranged in the fourth lens area LA4 reaches the fourth viewpoint, the image displayed in the sub-pixel arranged in the eighth lens area LA8 reaches the eighth viewpoint, and the image displayed in the sub-pixel arranged in the second lens area LA2 reaches the second viewpoint.

In FIG. 10, the first horizontal interpolation data HID(1,j+2) of the (j+2)th horizontal line is an average of the fifth 2D data SP(5,j+2), the second 2D data SP(2,j+2), and the eighth 2D data SP(8,j+2) of the (j+2)th horizontal line. With reference to FIGS. 3 and 10, the fifth 2D data SP(5,j+2) of the (j+2)th horizontal line is supplied to a sub-pixel arranged in the ninth lens area LA9, the second 2D data SP(2,j+2) of the (j+2)th horizontal line is supplied to a sub-pixel arranged in the third lens area LA3, and eighth 2D data SP(8,j+2) of the (j+2)th horizontal line is supplied to a sub-pixel arranged in the sixth lens area LA6. The image displayed in the sub-pixel arranged in the ninth lens area LA9 reaches the ninth viewpoint, the image displayed in the sub-pixel arranged in the third lens area LA3 reaches the third viewpoint, and the image displayed in the sub-pixel arranged in the sixth lens area LA6 reaches the sixth viewpoint.

Therefore, the kth vertical interpolation data VID(k,j) of the jth horizontal line includes data supplied to sub-pixels arranged in first to nth lens area LA1~LAn. With reference to FIGS. 3 and 10, the first vertical interpolation data VID(1,j) of the jth horizontal line includes the first 2D data SP(1,j) of the jth horizontal line supplied to the sub-pixel arranged in the first lens area LA1, and the seventh 2D data SP(7,j+2) of the (j+2)th horizontal line supplied to the sub-pixel arranged in the second lens area LA2. Also, the seventh 2D data SP(7,j+1) of the (j+1)th horizontal line supplied to the sub-pixel is arranged in the third lens area LA3, and the seventh 2D data SP(7,j) of the jth horizontal line supplied to the sub-pixel is arranged in the fourth lens area LA4. Also, the fourth 2D data SP(4,j+2) of the (j+2)th horizontal line supplied to the sub-pixel is arranged in the fifth lens area LA5, and the fourth 2D data SP(4,j+1) of the (j+1)th horizontal line supplied to the sub-pixel is arranged in the sixth lens area LA6. Also, the fourth 2D data SP(4,j) of the jth horizontal line supplied to the sub-pixel is arranged in the seventh lens area LA7, and the first 2D data SP(1,j+2) of the (j+2)th horizontal line supplied to the sub-pixel is arranged in the eighth lens area LA8. Furthermore, the first 2D data SP(1,j+1) of the (j+1)th horizontal line supplied to the sub-pixel is arranged in the ninth lens area LA9. Especially, the first, fourth, and seventh 2D data SP(1,j), SP(4,j), SP(7,j) of the jth horizontal line, the first, fourth, and seventh 2D data SP(1,j+1), SP(4,j+1), SP(7,j+1) of the (j+1)th horizontal line, and the first, fourth, and seventh 2D data SP(1,j+2), SP(4,j+2), SP(7,j+2) of the (j+2)th horizontal line are the same color data. Accordingly, the embodiments of the invention prevent the user from watching a part of the 2D images through each of the user's left-eye and right-eye. Therefore, the embodiments of the invention may improve 2D image quality in spite of non-glasses type implementing 3D images by the optical plate. (See S104 in FIG. 5)

The 2D data converter 140 outputs the 2D conversion data RGB2D' of 1 frame period including r*s vertical interpolation data to the timing controller 130. Meanwhile, the 2D data converter may output the 2D conversion data RGB2D' with higher frame frequency than input frame frequency. For example, the 2D data converter 140 may output 2D conversion data RGB2D' calculated from performing the vertical interpolation operation as expressed in the equation 5 after performing the horizontal interpolation operation according to the first exemplary embodiment as expressed in the equation 3 during an odd frame period. And then, the 2D data converter 140 may output 2D conversion data RGB2D' calculated from performing the vertical interpolation operation as expressed in the equation 5 after performing the horizontal interpolation operation according to the second exemplary embodiment as expressed in the equation 4 during an even frame period.

As described above, the embodiments of the invention convert the n 2D data for each sub-pixel based on the 2D data for all of the sub-pixels. Therefore, the embodiments of the invention prevent the user from watching a part of 2D images displayed in n sub-pixels through each of the user's left-eye and right-eye even though each of the user's left-eye and right-eye are positioned on any one viewpoint. Accordingly, the embodiments of the invention may improve 2D image quality in spite of non-glasses type implementing 3D images by the optical plate.

Figure 11:
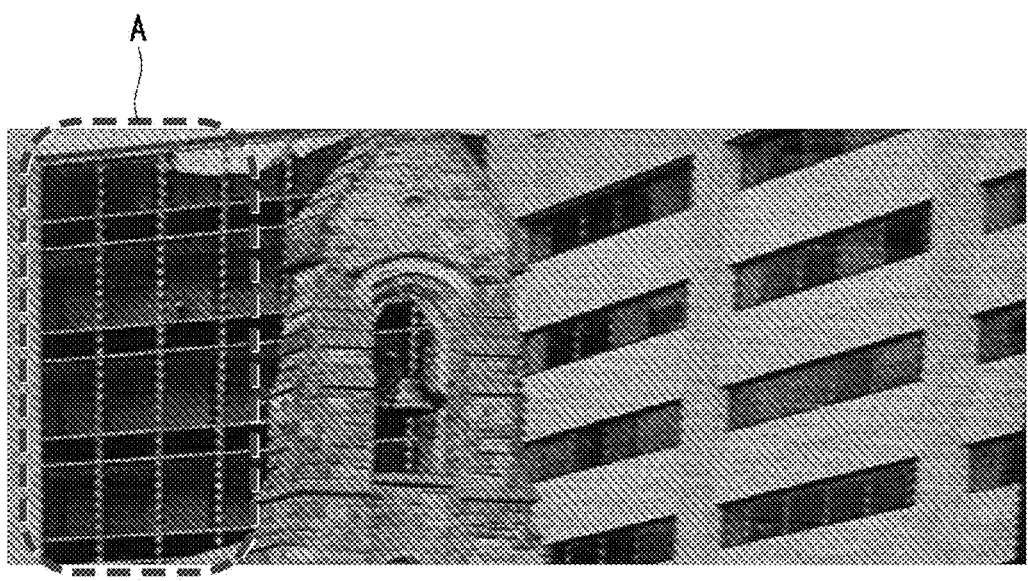
FIG. 11 is a screenshot of 2D image according to the related art.
Figure 12:
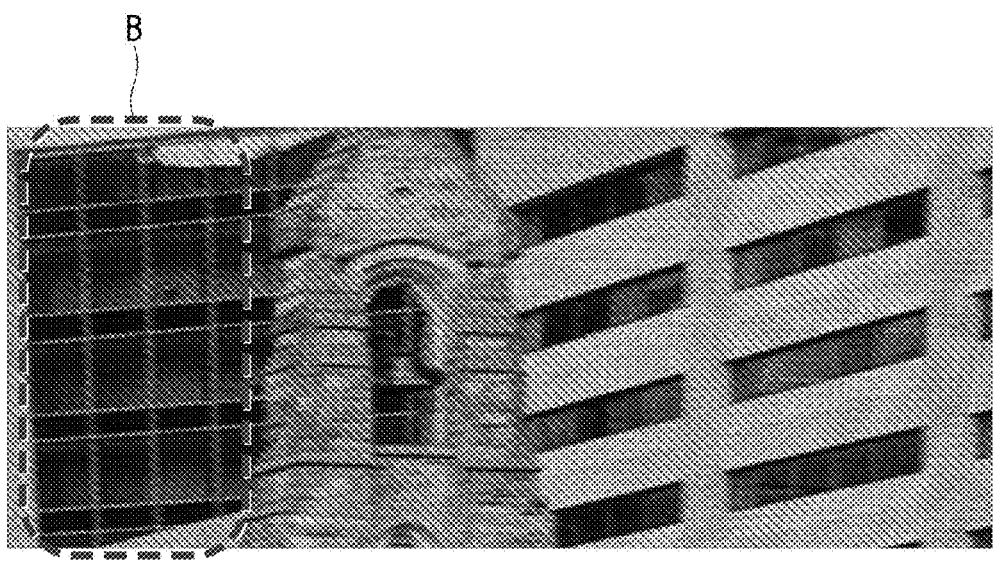
FIG. 12 is a screenshot of 2D image according to one embodiment.

FIG. 11 is a screenshot of 2D image according to the related art. FIG. 12 is a screenshot of 2D image according to the embodiments of the invention.

With reference to FIG. 11, In region "A" of the screenshot of the 2D image according to the related art, the user may watch that lines are not connected smoothly. It is because the user watches a part of the 2D images due to the optical plate for implementing 3D images.

With reference to FIG. 12, In region "B" of the screenshot of the 2D image according to the embodiments herein, the user may watch lines that are connected smoothly. This is because the embodiments of the invention converts the n 2D data supplied to n sub-pixels such that each of the n 2D data includes all of the n 2D data. Therefore, the embodiments of the invention prevent the user from watching a part of 2D images displayed in n sub-pixels through each of the user's left-eye and right-eye even though each of the user's left-eye and right-eye are positioned on any one viewpoint. Accordingly, the embodiments of the invention may improve 2D image quality in spite of non-glasses type implementing 3D images by the optical plate.

Although the embodiments of this application have been described with reference to a number of illustrative embodiments thereof, it should be understood that numerous other modifications and embodiments of this application can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A stereoscopic image display device comprising:
a display panel including a plurality of sub-pixels;
an optical plate configured to control display of images in n numbers of sub-pixels in n numbers of viewpoints located at different positions, wherein n is an integer equal to or greater than 2;
a 2D data converter configured to receive two-dimensional (2D) data for each of the n numbers of sub-pixels and to convert the 2D data for each of the n numbers of sub-pixels into different 2D data for each of the n numbers of sub-pixels, the different 2D data for each of the n numbers of sub-pixels being based on all of the 2D data for the n numbers of sub-pixels;
a display panel driving circuit configured to receive the different 2D data for each of the n numbers of sub-pixels and to supply each of the different 2D data to a corre- sponding one of the n numbers of sub-pixels in a two-dimensional (2D) mode of the stereoscopic image display device,
wherein the 2D data converter includes:
a horizontal interpolation unit configured to calculate a kth horizontal interpolation data of a jth horizontal line by using a plurality of 2D data of the jth horizontal line, wherein j and k are each an integer greater than 0; and
a vertical interpolation unit configured to calculate the kth vertical interpolation data of the jth horizontal line by using horizontal interpolation data of the jth horizontal line and adjacent lines to the jth horizontal line.

2. A stereoscopic image display device comprising:
a display panel including a plurality of sub-pixels;
an optical plate configured to control display of images in n numbers of sub-pixels in n numbers of viewpoints located at different positions, wherein n is an integer equal to or greater than 2;
a 2D data converter configured to receive two-dimensional (2D) data for each of the n numbers of sub-pixels and to convert the 2D data for each of the n numbers of sub-pixels into different 2D data for each of the n numbers of sub-pixels, the different 2D data for each of the n numbers of sub-pixels being based on all of the 2D data for the n numbers of sub-pixels;
a display panel driving circuit configured to receive the different 2D data for each of the n numbers of sub-pixels and to supply each of the different 2D data to a corresponding one of the n numbers of sub-pixels in a two-dimensional (2D) mode of the stereoscopic image display device,
wherein the 2D data converter includes:
a horizontal interpolation unit configured to calculate horizontal interpolation data for each of the n numbers of sub-pixels, the horizontal interpolation data for each of the n numbers of sub-pixels being calculated based on an average 2D data of a plurality of sub-pixels of a same color, the plurality of sub-pixels of the same color being included in a horizontal line of individual sub-pixels that also includes said each n numbers of sub-pixels; and
a vertical interpolation unit configured to calculate vertical interpolation data for each of the n numbers of sub-pixels, the vertical interpolation data for each n numbers of sub-pixels being calculated based on an average of the horizontal interpolation data for said each n numbers of sub-pixels and horizontal interpolation data of a corresponding one of n numbers of sub-pixels included in each of a plurality of horizontal lines of n numbers of sub-pixels that do not include said each n numbers of sub-pixels, and said corresponding one of the n numbers of sub-pixels being of a same color as said each n numbers of sub-pixels.

3. The stereoscopic image display device of claim 1, wherein the horizontal interpolation unit calculates a kth horizontal interpolation data on a jth horizontal line based on the following equation:

$$HID(k, j) = \frac{\sum_{u=1}^{HSN} SP(k + N \times (u-1), j)}{HSN}$$

wherein HID(k,j) refers to the kth horizontal interpolation data on the jth horizontal line,
wherein N refers to a number of n numbers of sub-pixels included in a pixel,
wherein HSN is a horizontal interpolation value that is based on a ratio of a horizontal repetition value and the N number of individual sub-pixels included in a pixel, the horizontal repetition value describing a number of n numbers of sub-pixels from a given sub-pixel to another sub-pixel both included in a same horizontal line of n numbers of sub-pixels, the another sub-pixel displaying a same color as the given sub-pixel and displaying a same image as the given sub-pixel, and
wherein SP(k+N*(u−1), j) refers to (k+N*(u−1), j)th 2D data on the jth horizontal line.

4. The stereoscopic image display device of claim 1, wherein the horizontal interpolation unit calculates a kth horizontal interpolation data on a jth horizontal line based on the following equation:

$$HID(k, j) = \frac{\sum_{u=1}^{HSN} SP(k - N \times (u-1), j)}{HSN}$$

wherein HID(k,j) refers to the kth horizontal interpolation data on the jth horizontal line,
wherein N refers to a number of n numbers of sub-pixels included in a pixel,
wherein HSN refers to a horizontal interpolation value that is based on a ratio of a horizontal repetition value and the N number of sub-pixels included in a pixel, the horizontal repetition value describing a number of n numbers of sub-pixels from a given sub-pixel to another individual sub-pixel both included in a same horizontal line of n numbers of sub-pixels, the another sub-pixel displaying a same color as the given sub-pixel and displaying a same image as the given sub-pixel, and
wherein SP(k−N*(u−1), j) refers to (k−N*(u−1), j)th 2D data on the jth horizontal line.

5. The stereoscopic image display device of claim 3, wherein the vertical interpolation unit calculates a kth vertical interpolation data on the jth horizontal line based on the following equation:

$$VID(k, j) = \frac{\sum_{v=0}^{VIN-1} HID(k, j+v)}{VIN}$$

wherein VID(k,j) refers to the kth vertical interpolation data on the jth horizontal line, and
wherein VIN is a vertical interpolation value that is based on a ratio of a total number of view image data and the horizontal interpolation value,
wherein HID(k, j+v) refers to the kth horizontal interpolation data on (j+v)th horizontal line.

6. The stereoscopic image display device of claim 1, wherein the 2D data converter is configured to receive multi-view image data in a 3D mode of the stereoscopic image display device and output the multi-view image data without converting the multi-view image data, and wherein the display panel driver is configured to receive the multi-view image data and supply the multi-view image data to a plurality of sub-pixels in the 3D mode.

7. A method for driving a stereoscopic image display device comprising a display panel including a plurality of sub-pixels, and an optical plate configured to control display of images in n numbers of sub-pixels in a plurality of viewpoints located at different positions, wherein n is an integer equal to or greater than 2, the method comprising:

receiving two-dimensional (2D) data for each of the n numbers of sub-pixels;

converting the 2D data for each of the n numbers of sub-pixels into different 2D data for each of the n numbers of sub-pixels, the different 2D data for each of the n numbers of sub-pixels based on all the 2D data for n numbers of sub-pixels; and supplying each of the different 2D data to a corresponding one of the n numbers of sub-pixels in a 2D mode of the stereoscopic image display device, wherein converting the 2D data comprises:

calculating a kth horizontal interpolation data of the jth horizontal line by using a plurality of 2D data of the jth horizontal line, wherein j and k are each an integer greater than 0; and calculating a kth vertical interpolation data of the jth horizontal line by using horizontal interpolation data of the jth horizontal line and lines other than the jth horizontal line.

8. A method for driving a stereoscopic image display device comprising a display panel including a plurality of sub-pixels, and an optical plate configured to control display of images in n numbers of sub-pixels in a plurality of viewpoints located at different positions, wherein n is an integer equal to or greater than 2, the method comprising:

receiving two-dimensional (2D) data for each of the n numbers of sub-pixels;

converting the 2D data for each of the n numbers of sub-pixels into different 2D data for each of the n numbers of sub-pixels, the different 2D data for each of the n numbers of sub-pixels based on all the 2D data for the n numbers of sub-pixels; and supplying each of the different 2D data to a corresponding one of the n numbers of sub-pixels in a 2D mode of the stereoscopic image display device, wherein converting the 2D data comprises:

calculating horizontal interpolation data for each of the n numbers of sub-pixels, the horizontal interpolation data for each of the n numbers of sub-pixels being calculated based on an average 2D data of a plurality of sub-pixels of a same color as said each n numbers of sub-pixels, the plurality of sub-pixels of the same color being included in a horizontal line of sub-pixels that also includes said each n numbers of sub-pixels; and calculating vertical interpolation data for each of the n numbers of sub-pixels, the vertical interpolation data for each n numbers of sub-pixels being calculated based on an average of the horizontal interpolation data for said each n numbers of sub-pixels and horizontal interpolation data of a corresponding one of n numbers of sub-pixels included in each of a plurality of horizontal lines of n numbers of sub-pixels that do not include said each n numbers of sub-pixels, and said corresponding one of the n numbers of sub-pixels being of a same color as said each n numbers of sub-pixels.

9. The method for driving the stereoscopic image display device of claim 7, wherein calculating the kth horizontal interpolation data of the jth horizontal line is based on the following equation:

$$HID(k, j) = \frac{\sum_{u=1}^{HSN} SP(k + N \times (u-1), j)}{HSN}$$

wherein HID(k,j) refers to the kth horizontal interpolation data on the jth horizontal line, wherein N refers to a number of n numbers of sub-pixels included in a pixel, wherein HSN is a horizontal interpolation value that is based on a ratio of a horizontal repetition value and the N number of sub-pixels included in a pixel, the horizontal repetition value describing a number of n numbers of sub-pixels from a given sub-pixel to another sub-pixel both included in a same horizontal line of n numbers of sub-pixels, the another sub-pixel displaying a same color as the given sub-pixel and displaying a same image as the given sub-pixel, and wherein SP(k+N*(u−1), j) refers to (k+N*(u−1), j)th 2D data on the jth horizontal line.

10. The method for driving the stereoscopic image display device of claim 7, wherein calculating the kth horizontal interpolation data of the jth horizontal line is based on the following equation:

$$HID(k, j) = \frac{\sum_{u=1}^{HSN} SP(k - N \times (u-1), j)}{HSN}$$

wherein HID(k,j) refers to the kth horizontal interpolation data on the jth horizontal line, wherein N refers to a number of n numbers of sub-pixels included in a pixel, wherein HSN refers to a horizontal interpolation value that is based on a ratio of a horizontal repetition value and the N number of sub-pixels included in a pixel, the horizontal repetition value describing a number of n numbers of sub-pixels from a given sub-pixel to another individual sub-pixel both included in a same horizontal line of n numbers of sub-pixels, the another sub-pixel displaying a same color as the given sub-pixel and displaying a same image as the given sub-pixel, and wherein SP(k−N*(u−1), j) refers to (k−N*(u−1), j)th 2D data on the jth horizontal line.

11. The method for driving the stereoscopic image display device of claim 9, wherein calculating the kth vertical interpolation data of the jth horizontal line is based on the following equation:

$$VID(k, j) = \frac{\sum_{v=0}^{VID-1} HID(k, j+v)}{VIN}$$

wherein VID(k,j) refers to the kth vertical interpolation data on the jth horizontal line, and wherein VIN is a vertical interpolation value that is based on a ratio of a total number of view image data and the horizontal interpolation value, wherein HID(k, j+v) refers to the kth horizontal interpolation data on (j+v)th horizontal line.

12. The method for driving the stereoscopic image display device of claim 7, further comprising:

supplying multi-view image data including a plurality of view image data to the plurality of individual sub-pixels in a 3D mode, and outputting the multi-view image data to the display panel driving circuit in the 3D mode.

13. The method for driving the stereoscopic image display device of claim 7, further comprising:

receiving multi-view image data in a 3D mode of the stereoscopic image display device;

outputting the multi-view image data without converting the multi-view image data; and supplying the multi-view image data to a plurality of sub-pixels in the 3D mode.

* * * * *